United States Patent [19]

Denzine et al.

[11] 4,432,883

[45] Feb. 21, 1984

[54] SEAL WITH TEFLON OR RUBBER

[75] Inventors: Allen F. Denzine, Chardon, Ohio; William E. F. Thurber, Jr., Houston, Tex.

[73] Assignee: Resistic Materials Inc., Houston, Tex.

[21] Appl. No.: 329,009

[22] Filed: Dec. 9, 1981

[51] Int. Cl.³ .......................... C10M 7/28; C10M 7/52
[52] U.S. Cl. .................................... 252/12; 75/126 D; 75/236
[58] Field of Search ................ 252/12; 75/236, 126 D

[56] References Cited

U.S. PATENT DOCUMENTS

| | | | |
|---|---|---|---|
| 3,713,788 | 1/1973 | Prill et al. | 75/236 |
| 3,967,935 | 7/1976 | Frehn | 75/126 D |
| 4,098,515 | 7/1978 | Sakata | 252/12 |

*Primary Examiner*—Jacqueline V. Howard
*Attorney, Agent, or Firm*—Yount & Tarolli

[57] ABSTRACT

A part is made of a material comprising less than 90% by weight of a polymer selected from the group consisting of polytetrafluoroethylene, polyurethane, nitrile, fluoroelastomer, and polyphenylene sulfide; and more than 10% by weight of another material, comprising about 15% to 60% by volume of grains of titanium carbide dispersed through a metal matrix.

18 Claims, 7 Drawing Figures

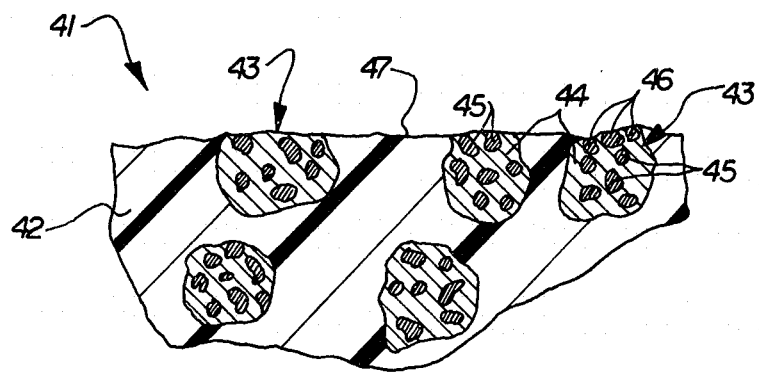
FIG.5
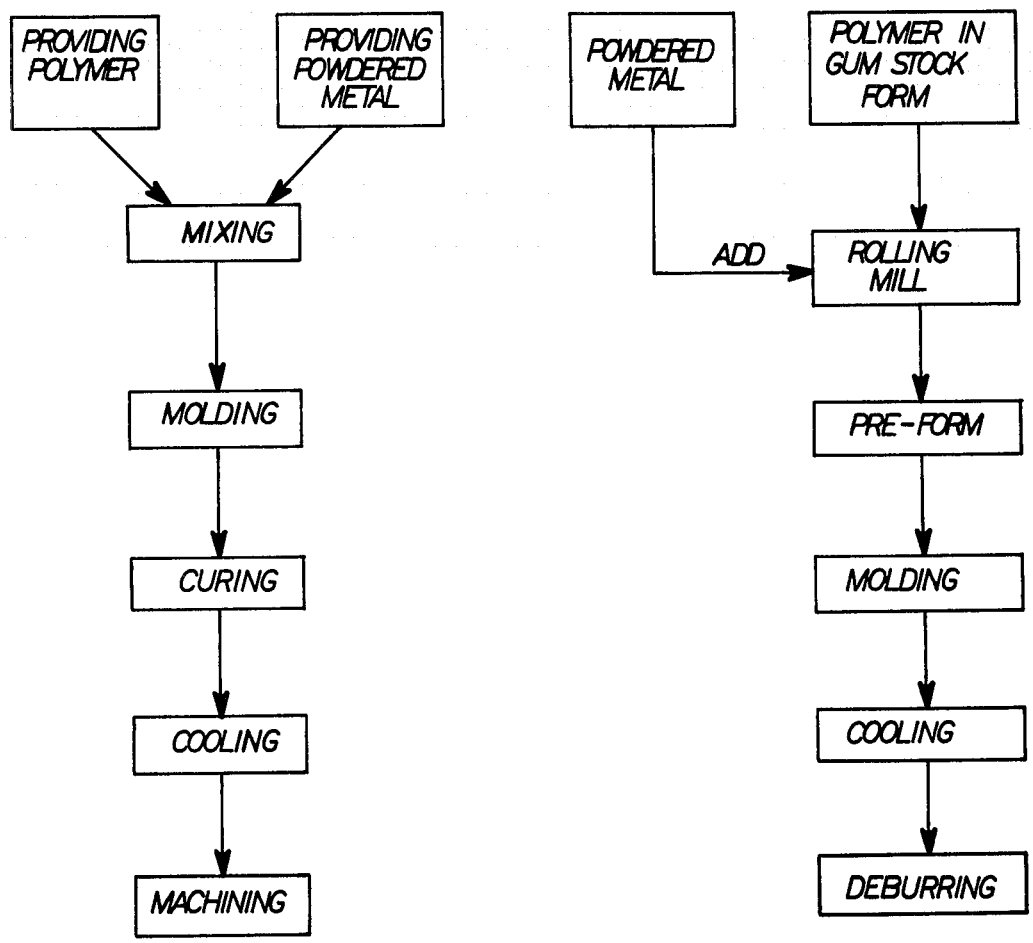
FIG.6
FIG.7

SEAL WITH TEFLON OR RUBBER

BACKGROUND OF THE INVENTION

This invention relates to a part for use in fluid handling, which part moves relative to another part. The invention particularly relates to a valve seat, seal, bearing or the like. Such parts are commonly made of rubber or a similar elastomer, or of polytetrafluoroethylene (PTFE). The invention relates specifically to a a material composed of a polymeric material and a powdered metal comprising grains of titanium carbide (TiC) dispersed through a metal matrix. A part made of such a material can replace an existing rubber or PTFE part and yield a longer life.

Materials composed of a polymeric material mixed with a powdered metal are well known. U.S. Pat. No. 1,998,892 discloses a mixture of metallic shreds, mineral lubricants, lubricating oil, and flaked or powdered metal with rubber or rubber cement to form a packing ring. The rubber serves as a binder to retain the metal flakes.

In U.S. Pat. No. 2,691,814 polytetrafluoroethylene (PTFE) in sheet or powder form is forced into a porous metallic structure by heating and applying pressure to the PTFE to form a bearing material not needing oils for lubrication. The powdered PTFE may also be mixed with a powdered metal capable of being sintered below the disassociating temperature of PTFE. However, the mixture must be sintered in an atmosphere of cracked ammonia at 360° C., using metal grains less than 149 micron size, and soft metals such as copper, tin, and lead are used.

Sintered PTFE particles may also be combined with carbon-fiber reinforced polyphenylene sulfide and heated to form injection molded floating ring seals for fluid sealing of rotating shafts as in U.S. Pat. No. 4,050,701. The surface of the seal must be machined to make available the lubricative properties of the dispersed PTFE. The PTFE particles used are of a relatively large size of 396–793 microns, and sintering is required for the PTFE to mix with the polyphenylene sulfide.

A seal member made of PTFE resin, containing iron alloy powder is shown in U.S. Pat. No. 4,098,515. The member is used as an abrasion-resistant oil seal ring, especially suitable for use on rotating shafts of aluminum or aluminum alloy. Also disclosed therein is the use of chromium molybdenum steel powder instead of cast iron powder.

The powdered metal of the type used in the present invention is disclosed in Prill U.S. Pat. Nos. 3,713,788 and 3,715,792. U.S. Pat. No. 3,713,788 discloses an age-hardenable, corrosion and heat resistant nickel-chromium matrix with TiC dispersed therein. U.S. Pat. No. 3,715,792 discloses a corrosion and wear resistant high-chromium matrix with TiC dispersed therein. Alloys such as these are commercially available from Chromalloy American Corporation under the trademark Ferro-Tic.

SUMMARY OF THE INVENTION

The invention relates to a part for use in fluid handling, composed of a first material comprising a polymeric material selected from the group consisting of polytetrafluoroethylene (PTFE), polyurethane, nitrile, fluoroelastomer, and polyphenylene sulfide; and a second powdered metal material comprising grains of titanium carbide (TiC) dispersed through a metal matrix.

The selection of the polymer is dependent upon the desired characteristics of the part as to temperature stability; inertness; resistance to liquids to which the part will be exposed; stiffness, resilience, and durability; and resistance to abrasion, corrosion and impact.

The second material is grains of titanium carbide dispersed through a metal matrix. Specifically, the second material consists of rounded grains of TiC dispersed through a metal matrix having either an iron-chromium base or a nickel-chromium base. This second material is in grains of a size of 37 to 250 microns. Each TiC grain is hard, inert, and rounded, and is therefore very slippery. This is in contrast to the sharp corners found in other carbide grains which can cause excessive abrasion of mating surfaces.

The ratio of the polymer to the powdered metal may be varied to achieve different results. Other factors which may be varied include the selection of the polymer; the mesh size of the grains of the powdered metal; the ratio of TiC to the matrix material and the matrix material for the TiC.

A part made of the material of the invention has substantial abrasion resistance and will still function well as a fluid handling device. For example, a seal made of this material of the invention will have high abrasion resistance yet still seal well.

The present invention also provides a method for making a part from the improved material of the invention.

There is thus provided a material for a part used in fluid handling retaining the high performance characteristics of a part made of the polymer and having improved properties such as increased durability, strength, and hardness through use of the TiC alloy grains. Such a part, since it has all the needed qualities of a part made of the polymer alone, may be substituted for a part composed of the polymer alone.

BRIEF DESCRIPTION OF THE DRAWINGS

Further features and advantages of the present invention will be apparent to those skilled in the art to which the invention relates from the following detailed description of a preferred embodiment of the invention made with reference to the accompanying drawings wherein:

FIG. 5 is a schematic view of a cross section of a part embodying the present;

FIG. 6 is a flow chart of a method of making a part embodying the present invention; and FIG. 7 is a flow chart of another method.

DESCRIPTION OF THE PREFERRED EMBODIMENT

Figure 1:
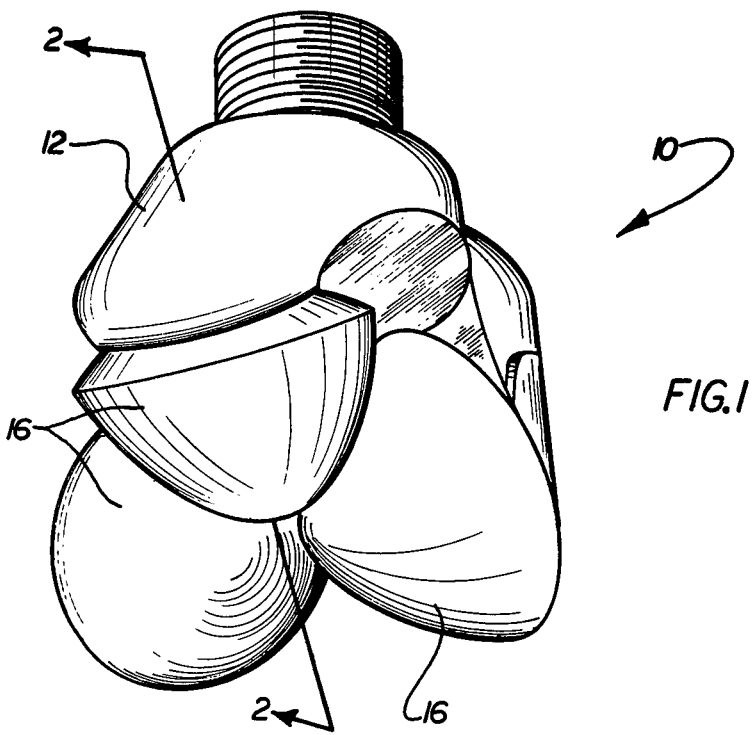
FIG. 1 is a schematic perspective view of a drill bit embodying a part constructed in accordance with the present invention.

In accordance with the invention one or more polymeric materials are combined with a powdered metal to make a part used in fluid handling. The powdered metal is comprised of of rounded titanium carbide grains bonded in a metal matrix. The powdered metal is commercially available from Chromalloy American Corporation under the trademark Ferro-Tic. Hereafter in this application the term powdered metal when used refers to Ferro-Tic.

There are many polymers available which may be used in the present invention. The polymer that is used for a particular part will be selected on the basis of the characteristics of the polymer and how the part is used. One such polymer is polytetrafluoroethylene (hereinafter "PTFE"). PTFE is useful for its high temperature stability, its inertness and its inherent exceptional lubricating qualities which are a result of its high resistance to binding with other materials with which it comes into contact.

Another material which may be used is polyphenylene sulfide, having high temperature strength and stiffness and corrosion resistance. As with PTFE, the exceptional wear resistance and lubricity of this material make it suitable for use as a sealing material of the type contemplated.

A third material which may be used is a polyurethane. Polyurethanes have resilience and durability and are highly resistant to abrasion and impact. These materials exhibit high tensile strength, and their resistance to petroleum oils, hydrocarbon fuels, oxygen and ozone is very good.

A material which may be used as the polymer is a fluorocarbon elastomer. These fluoroelastomers have an inherent compatibility with a wide range of chemicals and provide high temperature stability. They are also relatively resilient, a quality which again is desirable for a material for a seal for example. These materials are suitable for use with petroleum oils, silicon greases and hydrocarbons.

Another material which is a suitable polymer is nitrile, also known as buna N. Compounds of these materials are, for example, strandard in many O-ring applications. Nitrile materials perform satisfactorily in a wide variety of fluids, including petroleum, oils and gasoline alcohol and water. They are commonly used in O-rings for use in oil well drill bits.

The powdered metal which is used in the invention is described in U.S. Pat. Nos. 3,713,788; 3,715,792; 3,811,961; and 3,725,016. The material is an age hardenable corrosion and heat resistant refractory carbide powdered metal. The powdered metal comprises primary grains of titanium carbide. These carbide grains are dispersed through a metal matrix.

The powdered metal as used in the invention has either a nickel-chromium matrix or an iron-chromium matrix. The powdered metal comprises titanium carbide grains of about the size of 5 to 6 microns in diameter which are very hard, inert and are rounded. The TiC grains are uniformly dispersed through the metal matrix to provide a material which is in granular form and which is of the size of up to 250 microns in diameter.

The powdered metal used in the invention comprises generally 15% to 60% by volume of titanium carbide (TiC) grains, preferably about 45% by volume; and about 40% to 85% by volume of the metal matrix, preferably about 55% by volume. The nickel-chromium matrix comprises 50% to 80% by weight nickel, 10% to 25% by weight chromium, up to 16% by weight molybdenum or tungsten, up to 1% by weight carbon, and the balance iron. The nickel provides for corrosion resistance, the chromium provides durability in an oxidizing environment, the molybdenum or tungsten component provides resistance to pitting, and the carbon provides a high temperature strength. The iron may be provided in a nickel-iron alloy for lower cost.

The iron chromium matrix comprises about up to 20% by weight chromium, up to about 10% by weight molybdenum or tungsten, up to about 2% by weight carbon and the balance iron. The properties of the various components in the matrix are as described above.

As is known in the art, the make-up of the powdered metal, both in ratio of titanium carbide to matrix material and in the actual composition of the matrix material, may be varied in order to provide different qualities of the resulting powdered metal to fit different applications. It has been found that for the present invention, a desirable formulation for the nickel matrix of the powdered metal is approximately 72% nickel, approximately 18% chromium, about 1% molybdenum or tungsten, about 0.4% carbon and the balance being iron. For the purposes of the invention, it has been found that a preferable composition of the iron chromium matrix of the powdered metal is about 10% chromium, about 3% molybdenum or tungsten, about 0.85% carbon and the balance being iron.

The mesh size of the powdered metal grains in the composition is also a consideration. If the grains are too large, the quality of a seal is adversely affected as only a few large particles will be on the outer surface of the seal made of the material. Thus, wear of the seal can occur because only a few TiC particles engage the member or part which moves relative to the seal. On the other hand, if the grain size is too small, the cost of the material goes up significntly. Accordingly, it has been found that a preferable range of mesh size for the powdered metal grains is approximately 37 to 250 microns. It has been found that the mesh size of the powdered metal may be varied to provide different results. Such factors as tensile strength are affected by varying the size of the grains.

A part like a seal, when made of the material of the invention, has high abrasion resistance and wear resistance. This makes the seal suitable for use where there is relative movement between the seal and its mating part.

Figure 2:
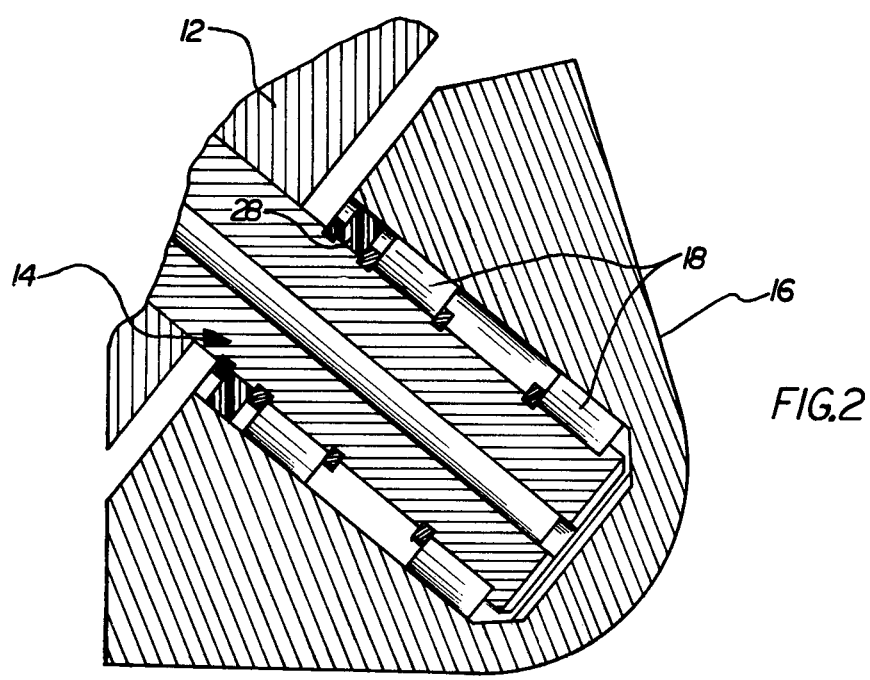
FIG. 2 is a sectional view of one of the cutters taken along lines 2—2 of FIG. 1.

FIGS. 1 and 2 illustrate a typical rotary drill bit in which a seal of the type contemplated by the invention may be used. The drill bit 10 includes a body 12 having an upwardly threaded end which is threaded into the lower end of a drill string which rotates the bit in the hole being drilled, in the usual manner. At its lower end, the body is provided with one or more, usually three, journals 14 which respectively extend downwardly and inwardly from adjacent the periphery of the body. Rotatably mounted on each journal 14 is a rotating cutter 16, the cutter being generally conical in shape as shown in the drawing and having an axial recess at one end for reception of the journal 14. Antifriction bearings 18 are provided internally between the cutter and the journal. The cutter 16 is provided with hardened inserts (not shown) or teeth or the like for grinding and fracturing the material at the bottom of the hole. An annular seal 28 encircles the journal 14. The O-ring seal is made of a material of the type disclosed herein.

The seal 28 serves the purpose of restraining the passage of contaminating material such as mud and rock into the internal anti-friction bearings 18, and also serves to retain the lubricants in the bearings. The seal, being made of a material of the present invention, has high tear strength and high abrasion resistance. This is especially important since the contaminants which will be pressing upon the seal, such as mud, rock bits, and dirt, are of an abrasive nature and will tend to wear away and reduce the life of the seal. A seal made of the material of the invention will provide a long life as compared to present known seals which are made of rubber or PTFE.

Figure 3:
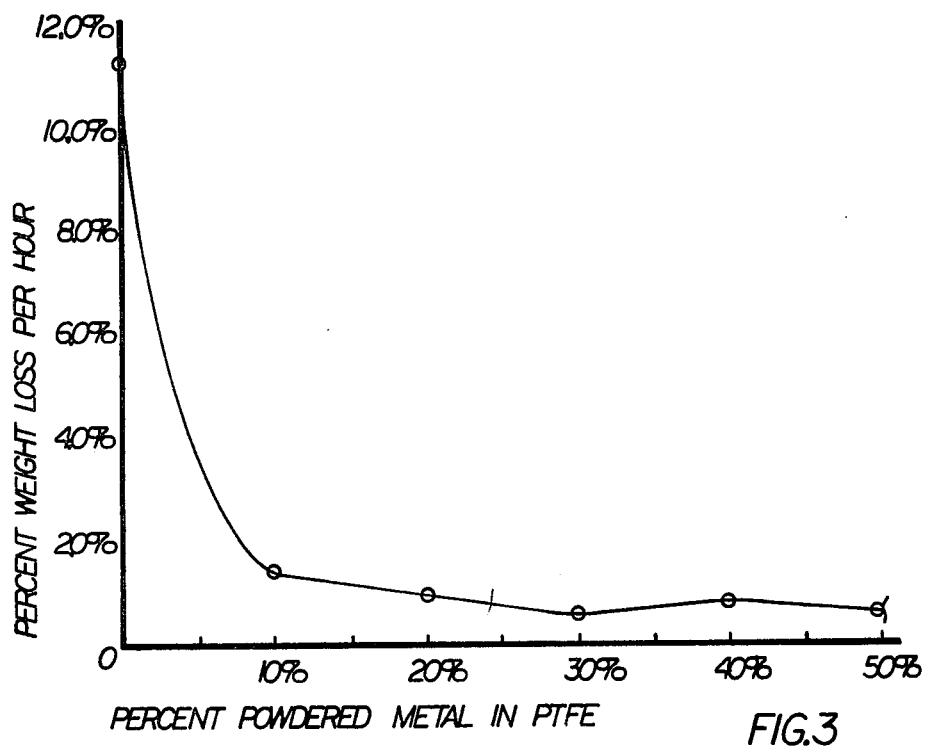
FIG. 3 is a graph showing the results of a wear test on a part of the type embodying the present invention.

As an example of the wear characteristics of various compositions of PTFE and powered metal, the results indicated in the following Table, which are graphically illustrated in FIG. 3, were obtained.

| Sample | Composition | % W Loss/Hr of Application of Abrasive wheel |
|---|---|---|
| 1 | 100 PTFE | 11.4 |
| 2 | 90 PTFE + 10 powdered metal-iron | 1.4 |
| 3 | 80 PTFE + 20 powdered metal-iron | 0.90 |
| 4 | 70 PTFE + 30 powdered metal-iron | 0.48 |
| 5 | 60 PTFE + 40 powdered metal-iron | 0.72 |
| 6 | 50 PTFE + 50 powdered metal-iron | 0.54 |
| 7 | 75 PTFE + 25 Glass | 8.40 |
| 8 | 45 PTFE + 40 iron + 15 Glass | 1.14 |
| 9 | 60 PTFE + 40 powdered metal-nickel (large) | 1.26 |
| 10 | 60 PTFE + 40 powdered metal-nickel (fine) | 4.14 |
| 11 | 80 PTFE + 20 powdered metal-nickel (fine) | 2.54 |

The composition of the samples is indicated in percentage by weight of the component materials, where PTFE is polytetrafluoroethylene; "powdered metal-iron" is iron-chromium matrix powdered metal, as described above, containing 45% TiC by volume; Glass is glass fiber; "powdered metal-nickel" is nickel-chromium matrix powdered metal, as described above, containing 45% TiC by volume, of both fine and large grain sizes. The last column of the table indicates percentage of weight lost due to application of an abrasive wheel.

The results indicate a substantial improvement in wear resistance when the powdered metal is added to the PTFE. For example, pure PTFE was abraded at the rate of 11.4% per hour; adding only 10% powdered metal-iron lowered the weight loss rate to 1.4% per hour; in the 30% to 50% powdered metal-iron range, the weight loss was near 0.5% per hour. The different results between large and fine nickel-chromium matrix powdered metal show the ability to vary characteristics by varying the mesh size of the powdered metal.

Figure 4:
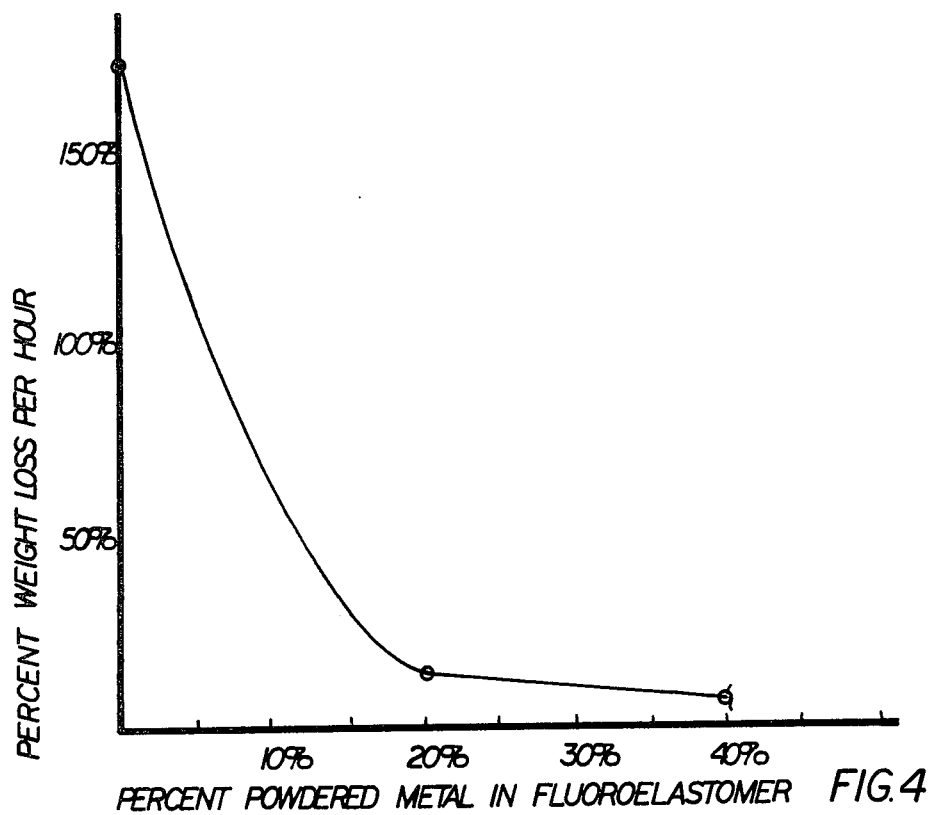
FIG. 4 is a graph showing the results of another wear test.

FIG. 4 depicts graphically the results of a wear test on samples made of a fluorocarbon elastomer made and sold by E. I. DuPont under the trademark Viton, and nickel-chromium matrix powdered metal ("powdered metal-nickel"), as follows.

| Sample Composition | % W Loss/Hr |
|---|---|
| Fluoroelastomer | 170.4 |
| Fluoroelastomer + 20% powdered metal-nickel | 14.4 |
| Fluoroelastomer + 40% powdered metal-nickel | 6.8 |

The abrasion test was run for five minutes. There is a dramatic increase in abrasion resistance from the addition of the powered metal-nickel to the elastomer. The addition of 40% powdered metal-nickel reduced the weight loss from 170.4% per hour to 6.8% per hour, by weight.

Further, other tests have shown no significant deterioration in coefficient of friction by the addition of powdered metal to PFTE. A composite of 50% PTFE, and 50% powdered metal of iron-chromium matrix and having 45% by volume of TiC, exhibited substantially the same coefficient of friction as virgin PTFE as against steel.

Testing of other samples of fluoroelastomer and powdered metal yielded the following results:

|  | 0% Powdered Metal-Nickel | 20% Powdered Metal-Nickel | 40% Powdered Metal-Nickel |
|---|---|---|---|
| Hardness | 90A | 92A | 95A |
| Tensile Strength | 2157 psi | 1981 psi | 1855 psi |
| Ultimate Elongation | 119% | 100% | 54% |
| Compression Set 70 hrs. 350° | 61% | 61% | 85% |
| Tear Strength | 82 ppi | 102 ppi | 160 ppi |

Only those characteristics of the composite which would be noncritical in an application such as an O-ring were adversely affected to a significant extent. The importance of substantial increase in tear strength is that greatly improved abrasion resistance results. This is important for use as a seal for an oil well drill, where particles of mud and rock are constantly attacking the seal.

Abrasion testing on these same samples of fluoroelastomer and powdered metal-nickel yielded these results:

| Abrasion Resistance (% weight loss) | 0% Powdered Metal-Nickel | 20% Powdered Metal-Nickel | 40% Powdered Metal-Nickel |
|---|---|---|---|
| 1,000 cycles | 8.37% | 2.33% | 1.63% |
| 2,000 cycles | 11.68% | 3.11% | 1.99% |
| 3,000 cycles | 27.25% | 5.50% | 3.17% |
| 4,000 cycles | 33.15% | 6.82% | 3.55% |
| 5,000 cycles | No Test | 7.5% | 3.78% |
| 6,000 cycles | — | 8.2% | 4.2% |
| 10,000 cycles | — | 10.18% | 6.25% |

An important consideration is that the addition of the powdered metal, while improving characteristics such as abrasion resistance (as shown in the table above), does not adversely affect the performance characteristics of the polymer.

Samples made of nitrile and powdered metal-nickel were formulated and tested. Nitrile is a material commonly used in O-rings, and test results shown below indicate the advantages of the sample over pure nitrile.

| Abrasion Resistance (% weight loss) | 0% Powdered Metal-Nickel | 20% Powdered Metal-Nickel | 40% Powdered Metal-Nickel |
|---|---|---|---|
| 2,000 cycles | 10.42% | 4.70% | 3.70% |
| 4,000 cycles | 31.8% | 11.8% | 8.4% |
| Hardness | 89A | 90A |  |
| Tensile Strength |  | 1455 | 1148 |
| Ult. Elongation |  | 175% | 140% |
| Tensile Stress 100% |  | 1101 | 1005 |

FIG. 5 is a schematic view of a cross section of a typical material of the invention, shown generally at 41.

The polymer 42 contains dispersed grains 43 of the powdered metal. Each grain 43 comprises a metal matrix 44 through which are dispersed the rounded TiC grains 45. Since the TiC grains 45 are uniformly dispersed in the metal matrix 44, there are some TiC grains on the surface of each powdered metal grain 43, as shown by the TiC grains 46. Further, the powdered metal grains 43 are dispersed through the polymer 42 so that some are exposed at the surface 47 of the material. Thus, there are provided a plurality of small (5-6 microns in diameter) hard TiC grains on the surface of the material, giving increased wear resistance and tear strength.

Although the invention has been described in terms of two ingredients, that is, powdered metal and the polymer, it may sometimes be desirable to add one or more other ingredients. For example, it has been found that the addition of carbon black will increase the hardness of the material without adversely affecting its other performance characteristics. Accordingly, the invention as claimed is not limited to parts made solely of polymer and powdered metal, but also encompasses the use of other materials, such as carbon black.

The parts of the present invention may be made by conventional compression-molding techniques. For PTFE parts the process, is illustrated in FIG. 6. The ingredients are first weighed, then blended at ambient temperature. The PTFE may be provided in flaked or granular form. For a batch size of 80 to 100 grams, they are blended for 3 to 5 minutes. The resulting mixture is then packed into a cylinder mold, and compression molded for 5 minutes at 3500-3700 psi. The molding time may be varied depending on the size of the piece to be molded. The resulting slug is then put in an electric furnace at ambient temperature. The temperature of the furnace is raised to about 700° F.-725° F., and is maintained for one hour per inch of minimum dimension or wall thickness to cure the slug. The furnace is then turned off and the slug is allowed to cool in the furnace. The slug may then be machined to the finished piece.

A part comprised of powdered metal and one of the polymers other than PTFE may be formed by a conventional molding processes. A particular method which has been used is illustrated in FIG. 7. The polymer is provided in the form of gum stock, i.e., in a sheet form. The gum stock is fed into a rolling mill, and the powdered metal is sprinkled onto the stock and is thus blended into the polymer. The resulting material is fed back through the rolling mill enough times until there is a uniform dispersion of the powdered metal through the polymer. This may be indicated by the color change noted as the powered metal is added.

Once the proper ratio of polymer to powdered metal is obtained, the resulting composite is preformed and placed into a mold cavity. The molding takes place at about 350° F.-400° F., at about 2000 psi, with a molding time of from one to ten minutes. The pressure and temperature may be varied with the particular compound being molded. The resulting part is air cooled, and the part may then be deburred.

The molding techniques described above are particular methods which have been used to form the parts of the invention. It should be understood that other conventional molding techniques may be used which yield the same results, and it is not intended to limit the scope of the invention by the foregoing description of the methods used.

Athough the present invention has been described with reference to preferred embodiments, it is to be understood that modifications and variations may be resorted to without departing from the spirit and scope of the invention. Uses for the material and parts of the invention, all of which are within the skill of the art to execute, are as valve seats, bearings, packings, compressor rings, piston rings, bushings, back-up rings, and cylinder liners. Such are considered to be within the scope of the invention and the claims.

We claim:

1. A composition of matter comprising about 50% to about 90% by weight of a polymeric material selected from the group consisting of polytetrafluoroethylene, polyurethane, nitrile, fluoroelastomer, and polyphenylene sulfide, and about 10% to about 50% by weight of another material comprising about 15% to 60% by volume of grains of titanium carbide dispersed through a metal matrix, wherein said metal matrix comprises a nickel-chromium matrix consisting essentially by weight of about 50% to 80% nickel, about 10% to 25% chromium, up to about 16% molybdenum or tungsten, up to about 1% carbon, and the balance essentially iron.

2. A composition of matter comprising about 50% to about 90% by weight of a polymeric mateial selected from the group consisting of polytetrafluoroethylene, polyurethane, nitrile, fluoroelastomer, and polyphenylene sulfide, and about 10% to about 50% by weight of another material comprising about 15% to 60% by volume of grains of titanium carbide dispersed through a metal matrix, wherein said metal matrix comprises an iron-chromium matrix consisting essentially by weight of up to about 20% chromium, up to about 10% molybdenum or tungsten, up to about 2% carbon, and the balance essentially iron.

3. A composition of matter as defined in one of claims 1 or 2 wherein said other material comprises about 45% by volume of grains of titanium carbide.

4. A composition of matter as defined in one of claims 1 or 2 comprising by weight about 50% to 80% of polytetrafluoroethylene and about 20% to 50% of said other material.

5. A composition of matter as defined in one of claims 1 or 2 comprising by weight about 60% to 80% of a polymeric material selected from the group consisting of polyurethane nitrile, fluoroelastomer, and polyphenylene sulfide, and about 20% to 40% of said other material.

6. A composition of matter as defined in claim 1, wherein said nickel-chromium matrix consists essentially by weight of about 72% nickel, about 18% chromium, about 1% molybdenum or tungsten, about 0.4% carbon, and the balance essentially iron.

7. A composition of matter as defined in claim 2, wherein said iron-chromium matrix consists essentially by weight of about 10% chromium, about 3% molybdenum or tungsten, about 0.85% carbon, and the balance essentially iron.

8. A composition of matter as defined in one of claims 1 or 2 comprising
   50% to 80% by weight of polytetrafluorethylene, and
   20% to 50% by weight of another material comprising 45% by volume of grains of titanium carbide dispersed through a metal matrix, said other material being in grains of a size of 37 to 250 microns.

9. A composition of matter as defined in claim 8, wherein said metal matrix consists essentially by weight of about 72% nickel, about 18% chromium, about 1% molybdenum or tungsten, about 0.4% carbon, and the balance essentially iron.

10. A composition of matter as defined in claim 8, wherein said metal matrix consists essentially by weight of about 10% chromium, about 3% molybdenum or tungsten, about 0.85 carbon, and the balance essentially iron.

11. A composition of matter as defined in one of claims 1 or 2 comprising by weight about 60% to 80% of a polymeric material selected from the group consisting of polyurethane, nitrile, fluoroelastomer, and polyphenylene sulfide, and about 20% to 40% by weight of another material comprising 45% by volume of grains of titanium carbide dispersed through a metal matrix, said other material being in grains of a size 37 to 250 of microns.

12. A composition of matter as defined in claim 11, wherein said metal matrix consists essentially by weight of about 72% nickel, about 18% chromium, about 1% molybdenum or tungsten, about 0.4% carbon, and the balance essentialy iron.

13. A composition of matter as defined in claim 11, wherein said metal matrix consists essentially by weight of about 10% chromium, about 3% molybdenum or tungsten, about 0.85% carbon, and the balance essentially iron.

14. A method comprising the steps of:

providing a predetermined amount of polymeric material selected from the group consisting of polytetrafluoroethylene, polyurethane, nitrile, fluoroelastomer, and polyphenylene sulfide;

providing a predetermined amount of another material comprising about 15% to 60% by volume of grains of titanium carbide dispersed through a metal matrix; and mixing said polymeric material and said other material to produce a mixture.

15. A method as in claim 14, further comprising the steps of molding said mixture to produce a slug, and curing said slug.

16. A method as in claim 15, further comprising the step of machining said cured slug.

17. A method as in claim 16, wherein said predetermined amount of said polymeric material comprises about 50% to about 90% by weight of said mixture, and said predetermined amount of said other material comprises more than 10% by weight of said mixture.

18. A method as in claim 17, further comprising the step of providing a predetermined amount of carbon black, and wherein said step of mixing said polymeric material and said other material to form a mixture comprises the step of mixing said polymeric material and said other material and said carbon black to form a mixture.

* * * * *